United States Patent [19]

Beuglot

[11] Patent Number: 4,717,530
[45] Date of Patent: Jan. 5, 1988

[54] PROCESS AND DEVICE FOR THE REMOTE UNDERWATER MONITORING OF A SMALL-SIZE COMPONENT OF A NUCLEAR REACTOR

[75] Inventor: Marcel Beuglot, Meximieux, France

[73] Assignee: Service National Electricite de France, Paris, France

[21] Appl. No.: 827,582

[22] Filed: Feb. 10, 1986

[30] Foreign Application Priority Data

Feb. 12, 1985 [FR] France .................. 85 01968

[51] Int. Cl.⁴ .................................. G21C 17/00
[52] U.S. Cl. ........................... 376/245; 376/248
[58] Field of Search ..................... 376/245, 248

[56] References Cited

U.S. PATENT DOCUMENTS

| | | | |
|---|---|---|---|
| 4,385,028 | 5/1983 | Salaman | 376/248 |
| 4,432,931 | 2/1984 | Lockett | 376/248 |
| 4,521,844 | 6/1985 | Sturges, Jr. et al. | 376/249 |

FOREIGN PATENT DOCUMENTS 0055647 7/1982 European Pat. Off. .
7508010 10/1976 France .

Primary Examiner—Salvatore Cangialosi
Attorney, Agent, or Firm—Sughrue, Mion, Zinn, Macpeak & Seas

[57] ABSTRACT

The process involves introducing into the structure (1) immersed in water, in the vicinity of the component (9) to be monitored, a means (30) of injecting water at a pressure higher than 40 MPa and in the form of a straight jet of a diameter less than $3 \times 10^{-3}$m. The injection means (30) is subsequently directed towards the component (9) to be monitored, and water is injected under pressure in such a way that the jet reaches the component (9). The position of the component after the action of the jet is monitored by a televisual means. When the pins of a guide tube (1) are to be monitored, the device also has, in addition to the televisual inspection means, a very long tube (30), in which an injection device having a nozzle in its lower part is arranged.

7 Claims, 7 Drawing Figures

PROCESS AND DEVICE FOR THE REMOTE UNDERWATER MONITORING OF A SMALL-SIZE COMPONENT OF A NUCLEAR REACTOR

The invention relates to a process and a device for the remote underwater monitoring of a small-size component of a nuclear reactor, to check the state of the connection between this component and a structure, in which it is arranged in an almost inaccessible position.

In nuclear reactors, such as pressurized-water which are nuclear reactors, there are small-size components which are located inside complex structures in almost inaccessible positions, and it is consequently difficult to monitor them. Furthermore, after remaining in the reactor for a certain period of time, these structures are contaminated by radioactive products, and it is necessary to monitor them and repair them by remote control and under water.

Some small-size components in the internal equipment of a nuclear reactor may perform an extremely important function, and for reasons of safety, it is necessary to ensure that these components are perfectly intact. It is necessary, at all events, to make sure, when the nuclear reactor is being maintained, that it is impossible for any component inside the vessel to come loose from the structure to which it is fastened.

As regards the upper internal equipment of the nuclear reactor, comorising in particular the set of guide tubes for the control rods of the reactor, the lower part of the guide tubes has centering pins which are intended to position themselves in holes provided in the upper plate of the reactor core. These centering pins are very important, because they determine the position of the guide tube for the control rods in relation to the assembly, into which the control rods will be introduced, and consequently the alignment of the control rods and guide tubes of this assembly. During the maintenance work carried out on the shutdown reactor, one of the operations involves extracting the upper internal equipment from the vessel and placing it on a stand located in the reactor pool, so that it can be checked and repaired. In particular, the state of the centering pins of the guide tubes and of the nuts fastening them to the lower flange of the guide tube is checked by introducing a television camera into the central part of the guide tube, to bring it as far as the base of the tube and level with the centering pins. The nuts of the pins, which project above the lower flange of the tube, can then be seen, and a check can be made to ascertain that they are present and perpendicular to the flange. However, even if the shank of the guide pin, on which the nut is screwed, is broken inside the flange, the nut can still remain in a correct position on the flange of the guide tube. A simple visual inspection does not always make it possible to check the state of the connection between the centering pin and the flange of the guide tube.

The object of the invention is, therefore, to provide a process for the remote underwater monitoring of a small-size component of a nuclear reactor, to check the state of the connection between this component and a structure, in which it is arranged in an almost inaccessible position, this process making it possible to determine, in all instances, whether the connection between the component and its structure has been destroyed because of a fracture.

To achieve this purpose, a means of injecting water at a pressure higher than 40 MPa and in the form of a straight jet of a diameter less than $3 \times 10^{-3}$ m is introduced into the structure immersed in water, in the vicinity of the component to be monitored, the injection means is directed towards the component to be monitored, water is injected under pressure in such a way that the jet reaches the component, and the position of the component after the action of the jet is monitored by a televisual means.

The invention also relates to a device for carrying out the monitoring process.

To make it easier to understand the invention, an embodiment of the process according to the invention, as regards the checking of the centering pins of a guide tube of a pressurized-water nuclear reactor, and the corresponding monitoring device will now be described by way of non-limiting example, with reference to the attached figures in which.

Figure 1:
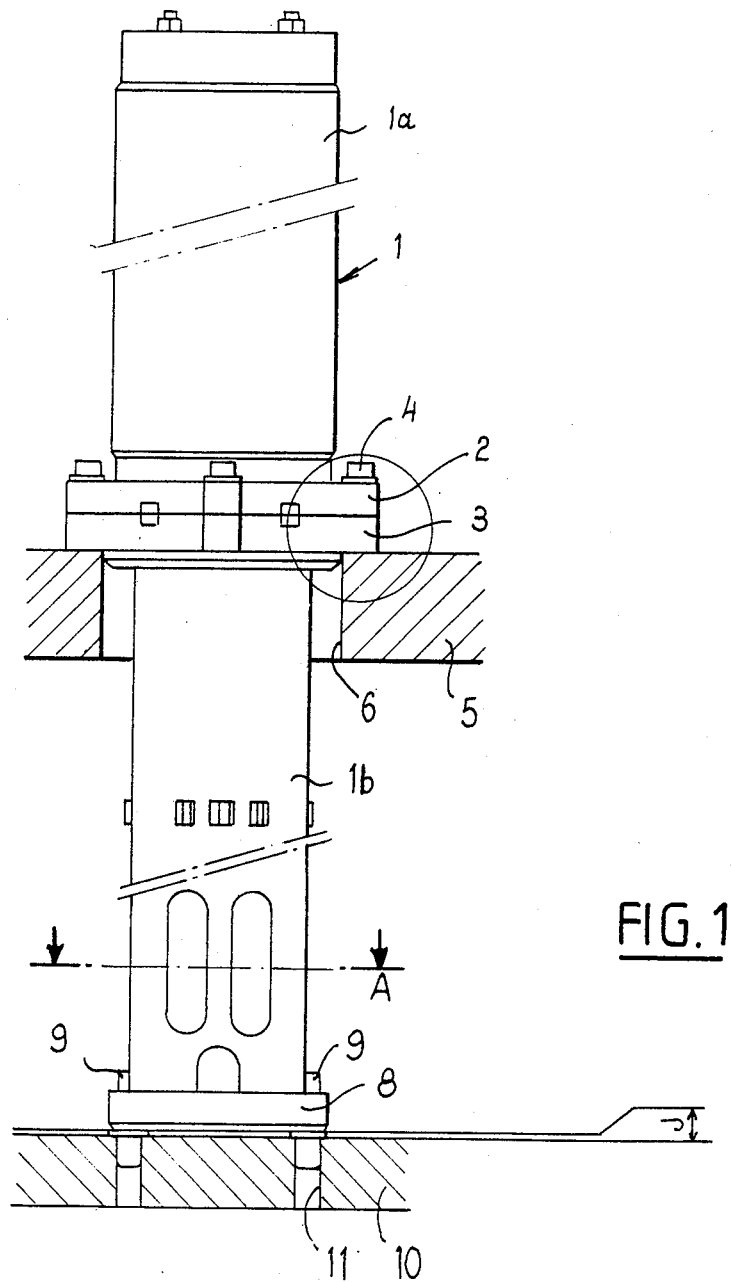
FIG. 1 is an elevation view of a guide tube in position in the vessel of the nuclear reactor.

FIG. 1 shows a guide tube 1 comprising an upper part 1a and a lower part 1b which are connected to one another by means of the lower flange 2 of the part 1a of the tube, the upper flange 3 of the lower part 1b of the guide tube and screw 4 engaged in tapped holes in the supporting plate 5 of the guide tubes 1. The supporting plate 5 has a set of orifices 6, each receiving a guide tube, the assembly flanges 2 and 3 of which rest on the upper face of the supporting plate 5.

The lower part 1b of the guide tube 1 carries a flange 8, on which are fastened the centering pins 9 which will be described in more detail with reference to FIGS. 3a and 3b. The lower part of each centering pin 9 is engaged in an orifice 11 made in the upper core plate 10 of the reactor. In the reactor vessel, the fuel assemblies are arranged under the plate 10. Located under each of the guide tubes 1 is an assembly, the guide tubes of which can receive the absorbent rods of a control rod group or control rod moveable inside the guide tube 1 and the assembly.

Within the guide tube 1, the control rod is guided by means of a set of devices consisting of intermittent-guidance paths in the upper part of the tube 1 and of continuous-guidance sleeves in the lower end zone of the part 1b of the tube 1.

The upper internal equipment is connected and made rigid by means of tubular spacers parallel to the guide tubes 1 and fastened to the supporting plate 5 in their upper part and to the upper core plate 10 in their lower part.

Figure 2:
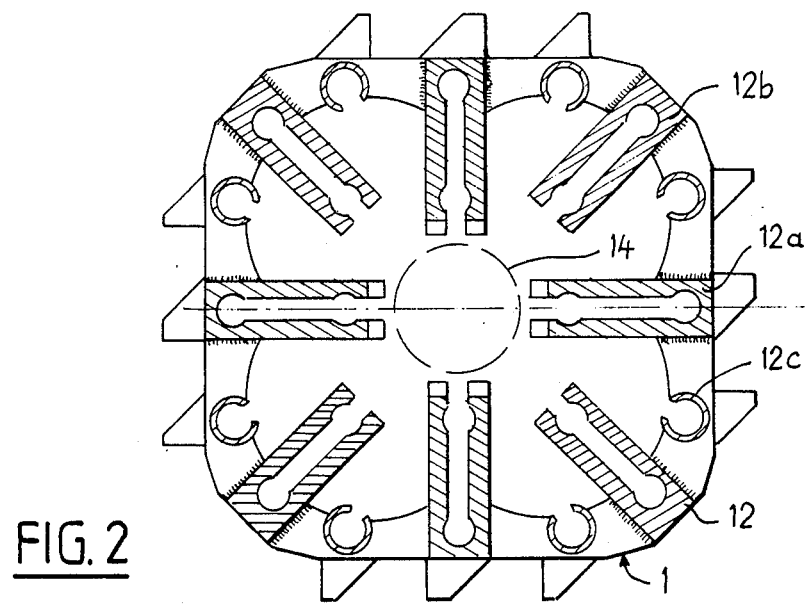
FIG. 2 is a cross-section along the line AA of the lower part of the guide tube shown in FIG. 1, possessing the devices for the continuous guidance of the control rods.

FIG. 2 shows a cross-section through the lower end zone of the guide tube 1 illustrated in FIG. 1. The continuous-guidance sleeves 12 are of three different types, the sleeves 12a and and 12b making it possible to guide two absorbent rods of the control rod group and the sleeves 12c allowing only a single rod to be guided. The sleeves 12a are arranged at 90° relative to one another and relative to the faces of the guide tube 1. These sleeves will be called 90° sleeves. The central part of the guide tube forms a free axial passage, in which it is possible to introduce and move along a cylindrical article 14, such as a television camera or a guide tube.

Figure 3A:
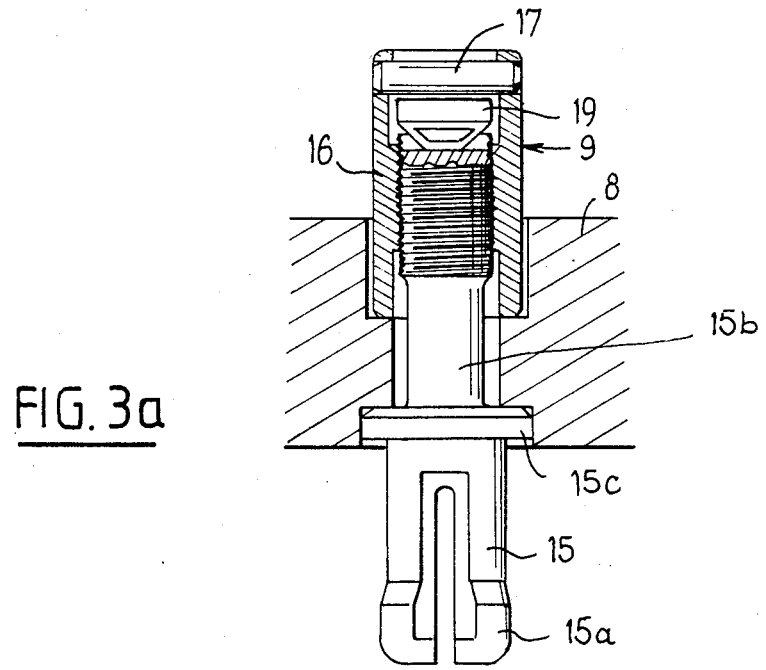
FIG. 3a is an elevation view, partially in section, of a centring pin of the guide tube shown in FIG. 1.
Figure 3B:
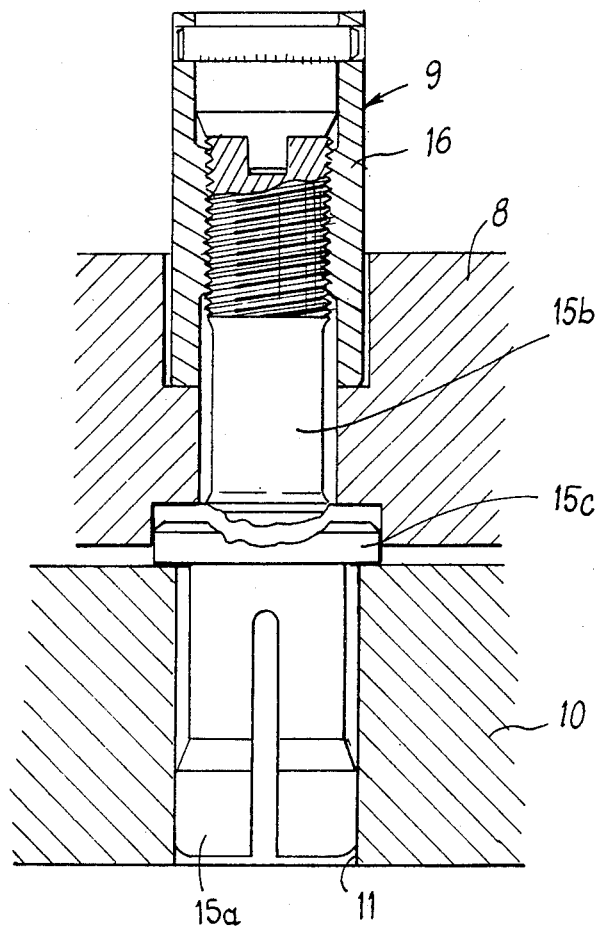
FIG. 3b is an elevation view, partially in section and similar to that of FIG. 3a, of a centering pin fractured over its entire cross-section.

FIGS. 3a and 3b show the assembly 9 consisting of the actual centering pin 15 and its fastening nut 16. The pin 15 comprises an elastically deformable part 15a, intended to position itself in the holes 11 in the upper core plate 10, and a shank 15b threaded in its upper part and connected to the part 15a of the pin by means of a collar 15c. The pin 15 is secured inside a hole passing through the flange 8 by tightening the nut 16 and making this nut 16 bear on the bottom of a front hole in the flange 8 and making the collar 15c bear on a rim on the inside of the flange 8. The fastening of the pin 15 is completed by welding a cotter 17 engaged in the nut 16 to a key 19 fitted in the shank 15b of the pin 15. The assembly 9 consisting of the guide pin and its nut is thus completely integral with the flange 8.

As can be seen in FIG. 3b, if the shank 15b of the pin has a fracture over its entire cross-section in its weak zone in the vicinity of the collar 15c the nut 16 and the shank 15b remain engaged in the flange 8, whilst the part 15a of the pin remains inserted in the hole 11 of the upper core plate 10. Thus, the assembly 9 consisting of the pin and its nut is capable of remaining in position during the transport of the upper internal equipment from the reactor vessel to the checking and repair stand. As can be seen in FIG. 2, a televisual inspection through the inside of the corresponding guide tube, using a television camera 14 introduced between the continuous-guidance sleeves 12a, cannot detect this total failure of the centering pin or the presence of an element which has come loose from the upper internal equipment and which can be carried along by the cooling fluid of the reactor after the latter has been started up again.

Figure 4:
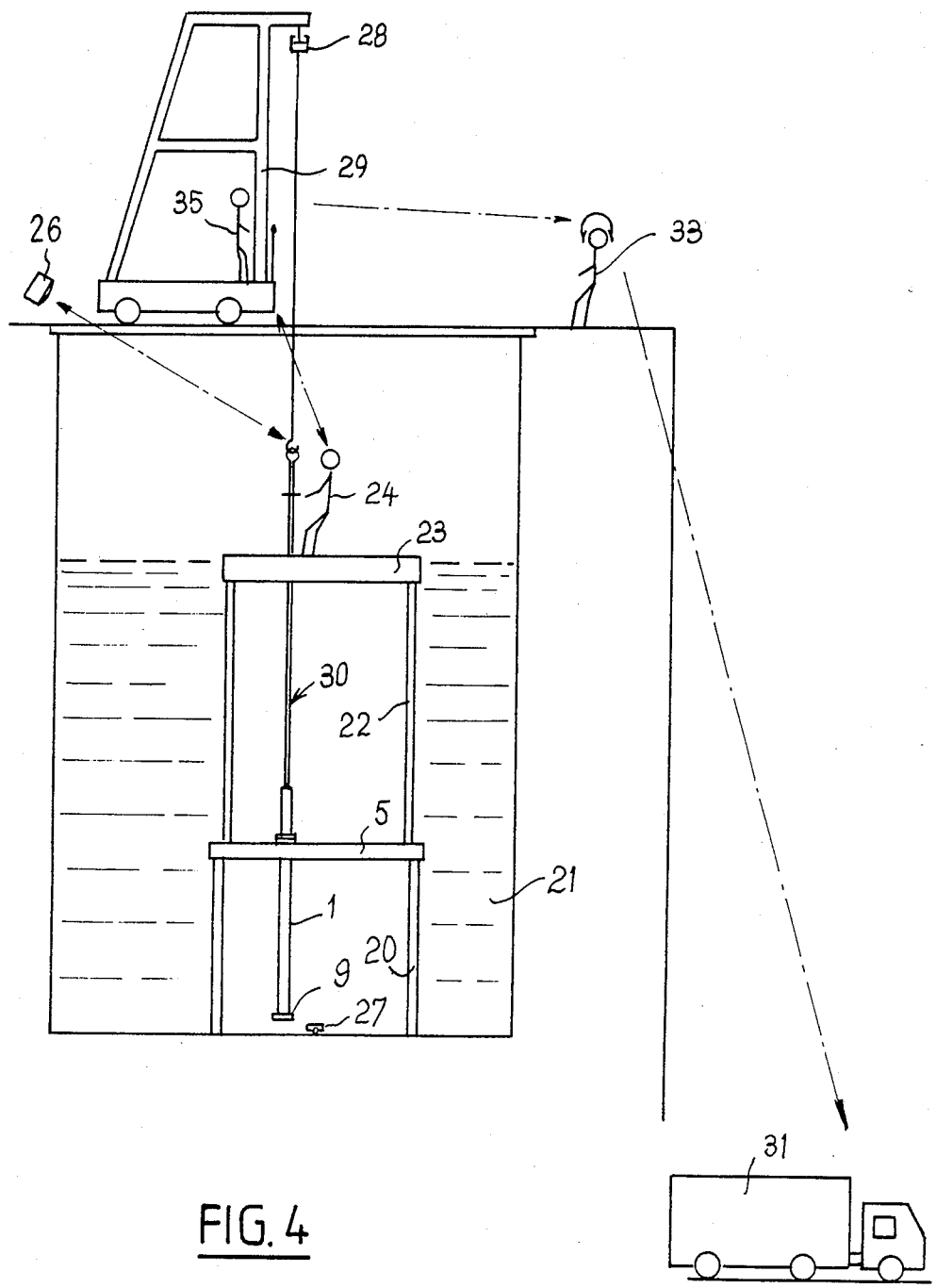
FIG. 4 is a general diagrammatic view of the means making it possible to carry out the monitoring process according to the invention, used for the centering pins of a guide tube.
Figure 5:
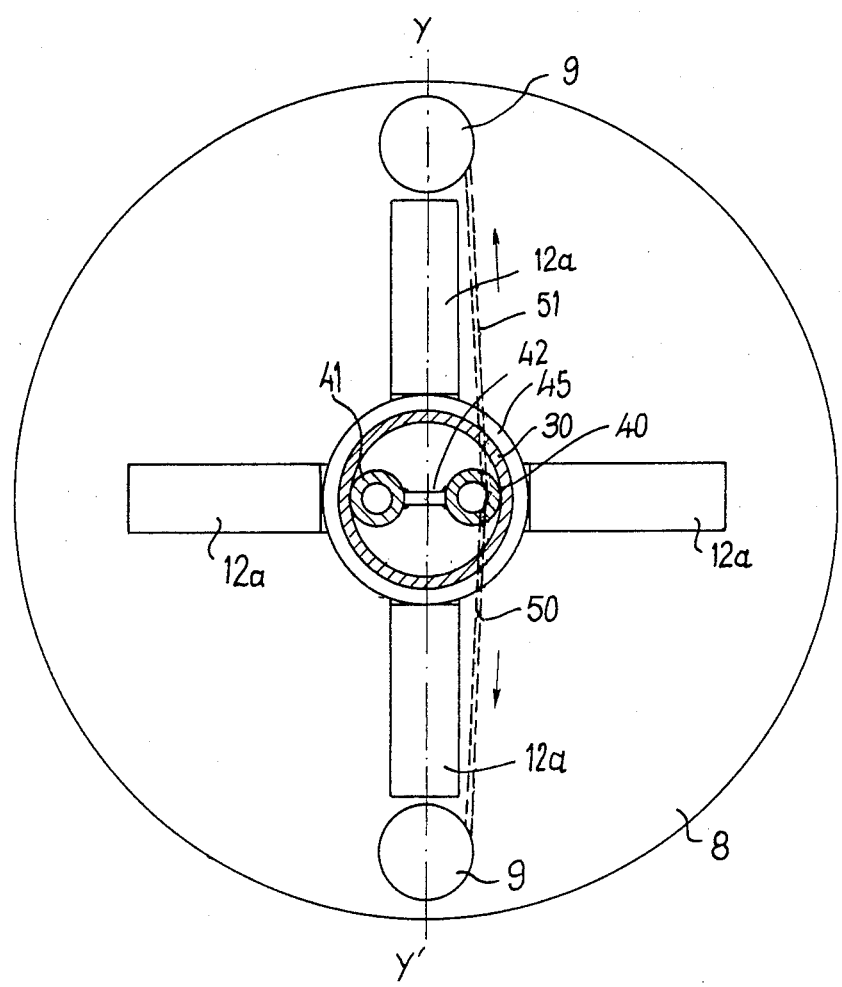
FIG. 5 is a cross-sectional view along the line BB of FIG. 6 of a water injection means making it possible to carry out the process according to the invention, in the working position in a guide tube.
Figure 6:
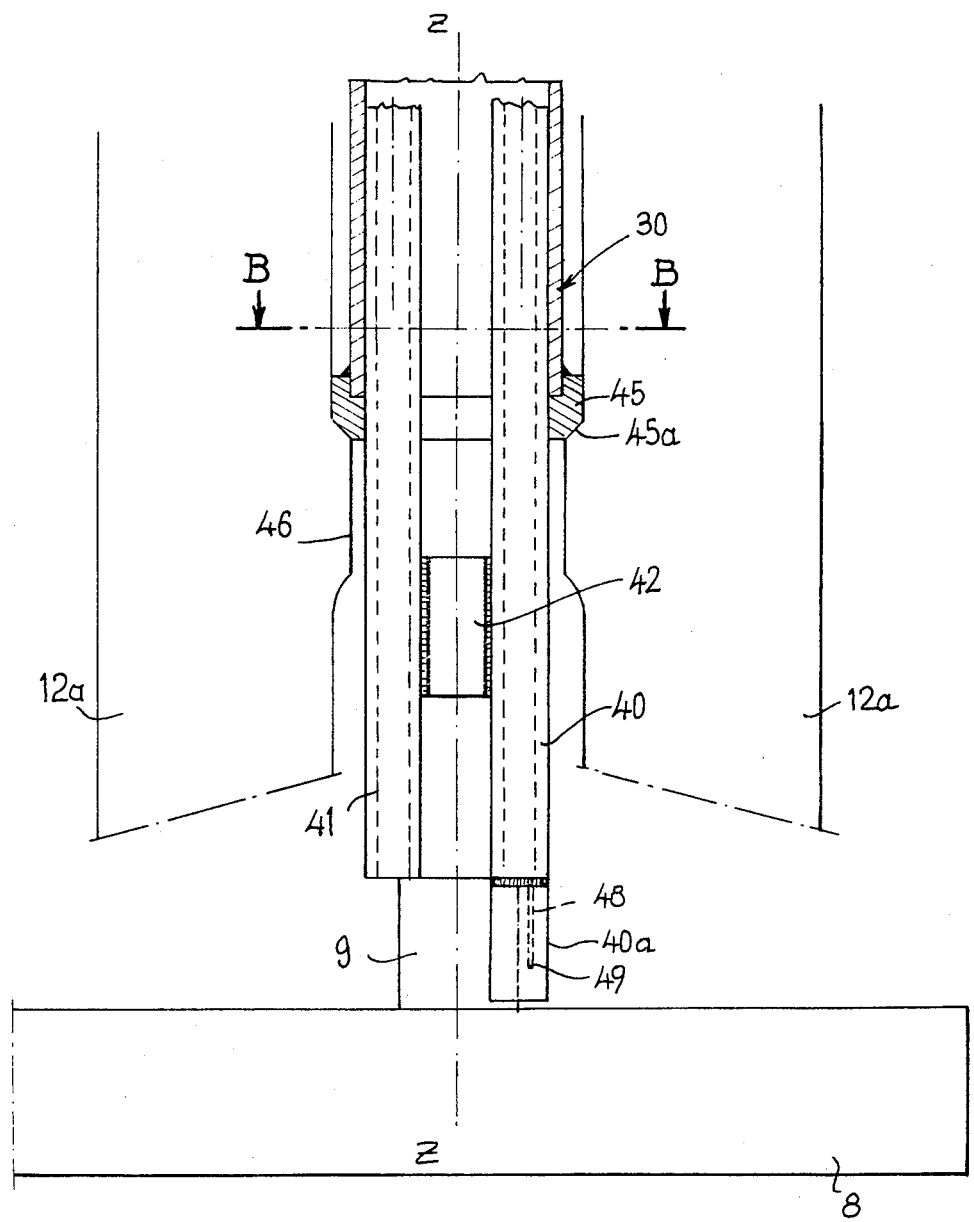
FIG. 6 is an elevation view, partially in section, of the lower part of the water injection device shown in FIG. 5, in the working position in a guide tube.

The process according to the invention, put into practice by using the installation and devices illustrated in FIGS. 4, 5 and 6, makes it possible to avoid these disadvantages and ascertain in a very reliable way the guide pins which have to be replaced.

FIG. 4 shows the storage support 20 for the upper internal equipment of a nuclear reactor, only the supporting plate 5 and a guide tube 1 being illustrated. The support 20 rests on the bottom of the reactor pool 21. Arranged above this support is a platform 22, the upper part of which 23 is rotatable. An operator 24 can ensure that the monitoring device is positioned and operated correctly from the rotary platform 23. A picture of the lower part of the internal equipment is available to the operator by means of a monitoring screen 26 connected to a camera 27 moving along on the bottom of the pool 21 under the internal equipment. The monitoring device 30 as a whole is suspended from the pulley block 28 of the reactor loading machine 29 which can move above the pool 21. A high-pressure pumping system 31 makes it possible to deliver water under a very high pressure ($50 \times 10^6$ Pa) to the inlet end of the device 30 by means of a pipeline (not shown). The pumping system 31 which can be moveable is brought near to the reactor pool 21. An operator 33 makes the connection between the operator 24 and the pumping station 31. Finally, the operator 35 controlling the loading machine synchronizes his action with that of the operator 24 to introduce the device 30 into the guide tube 1.

FIG. 4 shows the monitoring phase which involves introducing the device 30 consisting of a very long tube into the central axial space of the guide tube 1, this tube 30 having an outer contour such as that shown at 14 in FIG. 2. The upper end of the guide tube 1 is under several metres of water, and the device 30 is introduced into the tube 1 vertically by means of visual monitoring.

FIGS. 5 and 6 show in more detail the monitoring device which comprises, inside the tube 30, an assembly consisting of a pressurized-water injection tube 40 and a stiffening tube 41 with an axis parallel to the axis ZZ' of the tube 30, which are joined together by means of spacers, such as 42, distributed over their length. The spacing between the tubes 40 and 41 is such that their farthest spaced generatrices lines are at a distance from one another substantially equal to the inside diameter of the tube 30. This ensures perfect guidance of the assembly 40—41—42 which is mounted moveably inside the tube 30.

In the upper part of the tube 30, above the platform 23 where the operator 24 is located, the assembly 40—41—42 mounted slideably in the tube 30, itself fastened to the pulley block 28 of the loading machine 29, is secured to a manipulation device which allows it to be displaced axially and oriented very precisely about the axis ZZ'.

A ring 45 is fastened to the lower part of the tube 30. This ring 45 has an outside diameter which allows it to slide in a perfectly guided manner between the 90° sleeves 12a in the lower part of the guide tube 1. This ring 45 also has a frustoconical bearing surface 45a which, at the end of the lowering movement of the tube 30, comes up against ledges 46 projecting relative to the inner edge of the sleeves 12a. In its downward movement, the tube 30 is thus stopped in a position defined very specifically in relation to the upper face of the flange 8 and the projecting parts of the nuts of the pin/nut assemblies 9.

The injection tube 40 has a lower part 40a extended below the lower end of the stiffening tube 41 and perforated with an injection channel 48 and a calibrated nozzle 49, the diameter of which is $1.3 \times 10^{-3}$ mm. The nozzle 49 consists of two parts slightly inclined angularly, the axes of which are in a plane perpendicular to the axis ZZ' of the tube 30, to discharge two calibrated straight jets 50 and 51, as can be seen in FIG. 5; the jets 50 and 51 form an angle of 3° relative to the axis YY' of the two sleeves 12a, behind which the pins 9 are located.

When the tube 30 is in the low position, the ring 45 being up against the ledges 46, the operator lowers the assembly 40—41—42 so as to bring the nozzle 49 level with the projecting part of the pins 9. This vertical positioning is defined perfectly by the dimensional characteristics of the guide tube. The operator subsequently orients the nozzle 49 in such a way that its two parts are simultaneously directed towards both of the two projecting parts of the pins 9, as shown in FIG. 5. This orientation of the injection tube has to be monitored very accurately by means of the camera, since the accessible part of the pin is only of very small size.

When this positioning and orientation have been carried out in a highly accurate manner and monitored by the television camera, water at high pressure (50 MPa) is conveyed into the tube 40. This pressurized water penetrates into the injection channel 48 communicating with the tube 40 and then into the nozzles 49, to form the jets 50 and 51 which strike the pins 9 with sufficient force to displace and eject the nut 16 and the shank 15b of the pin, if this shank is fractured over its entire cross-section, as shown in FIG. 3b. In fact, the perfectly straight fine jet at high pressure has sufficient momentum to propagate within the pool water as far as the pin 9 and exert a sufficient push on the latter to eject it from the front hole in the flange 8.

If the pin 9 has no fracture, the pressurized jet is not capable of displacing the projecting part of the pin.

The water jet under high pressure, forming a parallel pencil of very small diameter, and the device making it possible to generate it have been called a hydrolaser by analogy with the optical laser.

After the pressurized jet has acted on the pins 9 of the guide tube 1, the injection tube is raised inside the tube 30, the latter then being extracted from the guide tube 1 by means of the pulley block 28 of the loading machine 29. A television camera suspended on the end of a cable is lowered, using a pulley block of the loading machine, into the central axial space of the guide tube 1, until it comes level with the upper face of the flange 8. The television camera then makes it possible to check the presence and position of the projecting parts of the pins 9. If at least one of the pins 9 is displaced or ejected, the tube 1 is dismounted and conveyed to a repair stand to equip it with a new pin.

It will be seen that the main advantages of the process and device according to the invention are that they make it possible to monitor small components in a complex structure, such as centering pins in a guide tube, extremely effectively by acting on part of the component to displace it or eject it and avoid the use of mechanical devices which it would be practically impossible or very difficult to introduce and operate in the structure of the guide tube.

The invention is not limited to the embodiment described.

Thus, it is possible to use a hydrolaser having different characteristics from those described; the diameter of the jet can be different from 1.3 mm and the pressure can be different from 50 MPa ($50 \times 10^6$ Pa). To carry out the process under good conditions, jets of a diameter of 1 to 3 mm under a pressure of 40 to 100 MPa can be used. Outside these ranges for the jet diameter and the pressure, there would no longer be any true effect of the hydrolaser type, that is to say a perfectly directed high-energy jet which can be used under a few meters of water.

The injection device can be of a different type from that described, and the means of inspecting the component after the action of the hydrolaser can be of any type, such as is used in nuclear reactors at the present time.

The process and device according to the invention are used not only for monitoring the guide pins of the guide tubes for the upper internal equipment of a pressurized-water nuclear reactor, but also for monitoring other small-size parts or components of the reactor, such as nuts, screws or keys.

The process and the device are used, in general terms, in all nuclear reactors which are monitored and maintained under water, or in all industrial installations which require special precautions for their maintenance or repair, necessitating work under water and by remote control.

I claim:

1. A process for the remote underwater monitoring of component (9) of a nuclear reactor, to check the state of the connection between this component (9) and a structure (1), in which it is arranged in an almost inaccessible position, said process comprising: introducing a means (30-40) of injecting water at a pressure higher than 40 MPa and in the form of a straight jet (50-51) of a diameter less than $3 \times 10^{-3}$ m into the structure (1) immersed in water, in the vicinity of the component (9) to be monitored, directing the injecting means (40) towards the component (9) to be monitored, injecting water under pressure to cause the jet (50-51) to reach the component (9), and monitoring the position of the component (9), after the action of the jet, by a televisual means.

2. A monitoring process as claimed in claim 1, further comprising choosing the jet (50-51) to have a diameter of between 1 and $3 \times 10^{-3}$ m and a pressure of between 40 and 100 MPa.

3. A monitoring process as claimed in claim 2, further comprising choosing the jet to have a diameter in the neighborhood of $1.3 \times 10^{-3}$ m and a pressure in the neighborhood of 50 MPa.

4. A monitoring process as claimed in claim 1, further comprising choosing as the component as an assembly (9) comprising a guide pin (15) and a nut (16) which are fastened to the lower flange (8) of a guide tube (1) for the upper internal equipment of a pressurized-water nuclear reactor, the guide tube constituting the structure to which the component is fastened.

5. A monitoring process as claimed in claim 4, further comprising introducing the injecting means (30) into the guide tube (1) via its central part between its guide sleeves (12).

6. A device for the remote underwater monitoring of a component of a pressurized-water nuclear reactor, where the component is a centering pin (9) of a guide tube for the upper internal equipment of the reactor, the device having in a known way a television camera and means of displacing it in the guide tube arranged vertically under water, wherein the device also has a tube (30), the outside diameter of which is less than the width of the space between the 90° sleeves (12a) of the tube (1), integral in its lower part with a bearing ring (45) of an outside diameter substantially equal to the space between the 90° sleeves (12a), and an assembly (40—41—42) having an injection tube (40) provided with a nozzle of a diameter less than $3 \times 10^{-3}$ m in its lower part and mounted slideably in the tube (30) in its axial direction and rotatably in this tube about its axis, means (28,29) of displacing the tube (30) in the vertical direction and means of axial displacement and pivoting relative to the tube (30) of the assembly (40—41—42) which is connected to a pumping system (31) by means of a pipeline.

7. A monitoring device as claimed in claim 6, wherein the assembly (40—41—42) has, in addition to the injection tube (40), a stiffening tube (41) connected to the tube (40) by means of spacers (42), with the axes of the tubes (40 and 41) being parallel and with their farthest spaced generatrices being at a distance from one another which is substantially equal to the inside diameter of the tube (30).

* * * * *